US007466633B2

(12) United States Patent
Giauque et al.

(10) Patent No.: US 7,466,633 B2
(45) Date of Patent: Dec. 16, 2008

(54) ELECTRONIC WATCH WITH INDICATION OF THE DIRECTION OF A PRE-PROGRAMMED GEOGRAPHICAL PLACE

(75) Inventors: Claude-Alain Giauque, Preles (CH); Uwe Schoenherr, Zuchwil (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 11/960,048

(22) Filed: Dec. 19, 2007

(65) Prior Publication Data

US 2008/0151697 A1 Jun. 26, 2008

(30) Foreign Application Priority Data

Dec. 22, 2006 (EP) .................................. 06127004

(51) Int. Cl.
*G04B 47/06* (2006.01)
*G04B 19/04* (2006.01)
*G01C 17/00* (2006.01)
*G01C 9/00* (2006.01)

(52) U.S. Cl. ............................ 368/11; 368/14; 368/80; 33/354; 33/355 R

(58) Field of Classification Search ................... 368/10, 368/11, 14, 80, 223; 33/316 R, 318, 319, 33/320, 354, 355 R
See application file for complete search history.

(56) References Cited

U.S. PATENT DOCUMENTS 4,482,255 A * 11/1984 Gygax et al. .................. 368/10
5,596,551 A * 1/1997 Born et al. .................... 368/10

(Continued)

FOREIGN PATENT DOCUMENTS

CH 632 894 A3 11/1982

(Continued)

OTHER PUBLICATIONS

European Search Report issued in corresponding application No. EP 06 12 7004, completed Jun. 12, 2007.

(Continued)

*Primary Examiner*—Vit W Miska
(74) *Attorney, Agent, or Firm*—Griffin & Szipl, P.C.

(57) ABSTRACT

The electronic watch (1) indicates the time using two hands (2, 3). This electronic watch includes an electronic compass (10), a processing unit (13) with a microcontroller (15) for calculating the direction of North on the basis of detection signals provided by magnetic sensors of the compass. The watch also includes motorised means (16) driving the hands controlled by the processing unit in order to place the hands (2, 3) in a time mode, a selected direction mode or a selected compass mode, and a manual control member (4) connected to the microcontroller processing unit. This control member (4) can be manually activated in a selection position in order to perform selection from the time mode to the direction mode and/or to the compass mode. In the selected direction mode the control member (4) can be pulled out into a stable setting position for setting, via the two superposed hands (2, 3), a direction parameter of a pre-programmed geographical place as a function of the geographical place where the watch is located. In a selected compass mode, the two hands are positioned in opposition to indicate the direction of North.

6 Claims, 2 Drawing Sheets

U.S. PATENT DOCUMENTS

| | | | | |
|---|---|---|---|---|
| 5,697,162 | A * | 12/1997 | Bornand et al. | 33/352 |
| 5,721,713 | A | 2/1998 | Bornand | |
| 5,790,477 | A * | 8/1998 | Hauke | 368/10 |
| 5,883,861 | A * | 3/1999 | Moser et al. | 368/10 |
| 6,385,133 | B1 * | 5/2002 | Miyauchi | 368/10 |
| 6,754,137 | B1 | 6/2004 | Bourquin et al. | |
| 7,113,451 | B1 | 9/2006 | Matthey | |
| 7,286,063 | B2 * | 10/2007 | Gauthey et al. | 341/34 |
| 2004/0002693 | A1 * | 1/2004 | Bright et al. | 604/533 |
| 2004/0113819 | A1 * | 6/2004 | Gauthey et al. | 341/34 |
| 2004/0160859 | A1 * | 8/2004 | Germiquet et al. | 368/14 |
| 2007/0002693 | A1 * | 1/2007 | Blondeau et al. | 368/80 |

FOREIGN PATENT DOCUMENTS

| | | | |
|---|---|---|---|
| EP | 0 569 868 | A1 | 11/1993 |
| EP | 0 713 162 | A1 | 5/1996 |
| EP | 0 721 155 | A1 | 7/1996 |
| EP | 1 435 633 | A1 | 7/2004 |
| EP | 1 701 229 | A1 | 9/2006 |

OTHER PUBLICATIONS

"Electronic analog wristwatch comprising a compass and an altimeter function," http://www.web.archive.org/web/20050204165120/http://www/k-technik.ch/patentefulleng.htm, printed Jun. 11, 2008.

"Review of the Tissot T-Touch Tactile Watch," Dec. 11, 2004, http://web20061113201622/http://www.watchreport.com/2004/12/review_of_the_t.hyml, printed Jun. 11, 2008.

Search Report issued by the Australian Patent Office in the corresponding Singapore application No. SG 200718972-3.

* cited by examiner

ELECTRONIC WATCH WITH INDICATION OF THE DIRECTION OF A PRE-PROGRAMMED GEOGRAPHICAL PLACE

This application claims priority from European Patent Application No. 06127004.7 filed Dec. 22, 2006, the entire disclosure of which is incorporated herein by reference.

FIELD OF THE INVENTION

The invention concerns an electronic watch with a time indication via at least two hands able to be used for indicating the direction to a pre-programmed geographical place, such as Mecca. In order to do this, the electronic watch includes at least one terrestrial magnetic field sensor of an electronic compass integrated in the watchcase. The watch also includes a microcontroller processing unit for calculating the direction of North on the basis of detection signals supplied by the magnetic sensor. Motorised means for driving the hands of the watch are controlled by the processing unit in order to place the hands in a time mode, a selected direction mode or a selected compass mode. A manual control member of the watch controls the operations of the processing unit.

BACKGROUND OF THE INVENTION

Several variants of an electronic watch have already been proposed in the past, particularly for providing information as to the direction of a determined geographical location or other types of information. It is for example known to provide such information relating to the direction of a pre-programmed geographical place, such as Mecca. In order to do this, it may be possible, first of all, to select or programme in the watch the geographical place where the watch user is located. A compass may also be provided in the watch to provide an indication of magnetic or geographical North in order to allow the watch to provide an indication using at least one hand in the direction, for example, of Mecca (Kaaba).

European Patent No. EP 0 713 162, which discloses an electronic watch, fitted with an electronic compass, can be cited in this regard. This compass is formed of a permanent magnet, mounted so as to rotate freely on an arbour in a frame, and first and second sensors for the magnetic field generated by the permanent magnet. These two sensors are able to provide first and second detection signals to an electronic processing unit to enable said unit to calculate the direction of the magnetic axis of the magnet, which corresponds to terrestrial magnetic North. This electronic processing unit controls at least one electric motor driving the hands to allow the display with at least one time indication hand, of the direction of a pre-programmed geographical place, for example Mecca.

In a compass mode, selected by the action of one among several manual control members of the watch, the direction of magnetic North can also be continuously indicated by at least one of the hands. A correction of the orientation of North relative to the geographical place (magnetic declination) where the user of the watch is located can be programmed in a data storage unit by the user so as to allow the watch to calculate the correct direction of geographical North.

In a mode for setting the geographical place where the watch user is located, the minute hand can be moved, first of all, in a first direction of rotation, to select a magnetic azimuth as a function of the place occupied. The magnetic declination of the place occupied is then introduced in order to convert the magnetic azimuth into a geographical azimuth using the control members. When driven in a second direction of rotation, the minute hand can also select a town or a region or a country, or an angular indication, which are shown on an LCD type screen.

European Patent Application No. EP 1 701 229 also discloses an electronic watch with a compass function of a similar type to the electronic watch of EP 0 713 162. However, a third time indicating hand indicates the direction of a pre-programmed geographical place, such as Mecca, while the other two hands indicate the direction of magnetic or geographical North.

In most known electronic watches, such as those cited above, which include an electronic compass and means for indicating, via hands, the direction of Mecca, or the direction of magnetic or geographical North, many programming or selection manipulations are necessary. Consequently, this makes it difficult for any user of such an electronic watch to remember easily all of the necessary programming or selection manipulations, which constitutes a drawback. Moreover, some confusion may arise as to which selected mode, between the time mode, the direction mode or the compass mode, is actually being displayed by the hands.

SUMMARY OF THE INVENTION

It is a main object of the present invention to provide an electronic watch wherein the time is indicated by hands including means for selecting and setting a direction parameter, and providing a display by the hands that is quite distinct from one selected mode to another, which is very simple to manipulate, and that overcomes the drawbacks of the afore-cited state of the art.

The invention therefore concerns an electronic watch cited above which includes the features defined in claim 1.

Advantageous embodiments of the electronic watch are defined in the dependent claims 2 to 5.

One advantage of the electronic watch according to the invention lies in the fact that selection of the direction mode and the compass mode from the time mode is achieved very simply using a single manual control member. The setting of direction parameter of the geographical place pre-programmed in the watch as a function of the place where the user is located is also set by the same manual control member in the selected direction mode. In this manner, it is very easy, using the watch hands, to consult a pre-programmed geographical place direction in the selected direction mode, and a magnetic or geographical North direction in the selected compass mode.

In the case where the manual control member is an electronic stem crown, it is very simple to pass from the time mode to the direction mode, then to the compass mode. A quick first application of pressure on the stem crown, causing the stem to pass from a rest position to an instable selection position against a spring means, allows, for example, the direction mode to be selected. A quick second application of pressure on the stem crown within a determined timeout after the first application of pressure, for example allows the compass mode to be selected from the direction mode. Without any action on the stem crown during the determined timeout, which has been previously programmed and stored in storage means of the processing unit, the time mode is selected again. This timeout may be, for example, programmed for a period of 30 seconds and can easily be changed without any complications.

Advantageously, the hands are in a superposed position in the selected direction mode, whereas the hands are in opposition in the selected compass mode. The microcontroller of the processing unit thus controls the motorised means driving the hands on the basis of one or two applications of pressure on the control member to place the hands either in a superposed position or in opposition. In this manner, each mode selected is quite distinct and one can easily tell which type of indication the positioned hands are showing.

In the selected direction mode following the first application of pressure on the stem crown, a direction parameter can be set by pulling said stem out into a stable setting position. In this stable position, the two superposed hands can be rotated by turning the stem crown in one direction or the other as far as a mark on the watch dial or on the watch bezel corresponding to the direction parameter to be set. Preferably, the bezel includes angular markings from 0 to 360°, which are shown in the clockwise direction over the entire periphery of the bezel from a 12 o'clock position on the watch. By arranging the hands at an angular marking, a geographical azimuth relative to the pre-programmed geographical place is set from the place occupied by the user. Pushing the crown into the rest position, stores the geographical azimuth and the superposed hands indicate the direction of the pre-programmed geographical place, which is preferably the direction of Mecca.

Advantageously, several geographical azimuths corresponding to several places in the world are inscribed, either on the back of the watch wristband, to avoid impairing the aesthetic appearance of the watch, or on the wristband, or on a credit card shaped card in order to inform the user easily as to which parameter to set. Since the electronic watch does not include any indications on the dial other than the time indication, the aesthetic appearance of the watch is preserved while allowing the user to be able to find out at any time the direction of the pre-programmed geographical place, such as Mecca.

BRIEF DESCRIPTION OF THE DRAWINGS

The objects, advantages and features of the electronic watch with an indication of a pre-programmed geographical place, such as Mecca, will appear more clearly in the following description of at least one non-limiting embodiment with reference to the drawings, in which.

DETAILED DESCRIPTION OF THE PREFERRED EMBODIMENTS

In the following description, all of the elements of the electronic watch that are well known to those skilled in the art are related in only a simplified manner. The electronic watch is of the type indicating the time via at least two hands, conventionally arranged on two arbours passing through the centre of the dial, and fitted with an electronic compass for a direction indication function of said watch.

Figure 1:
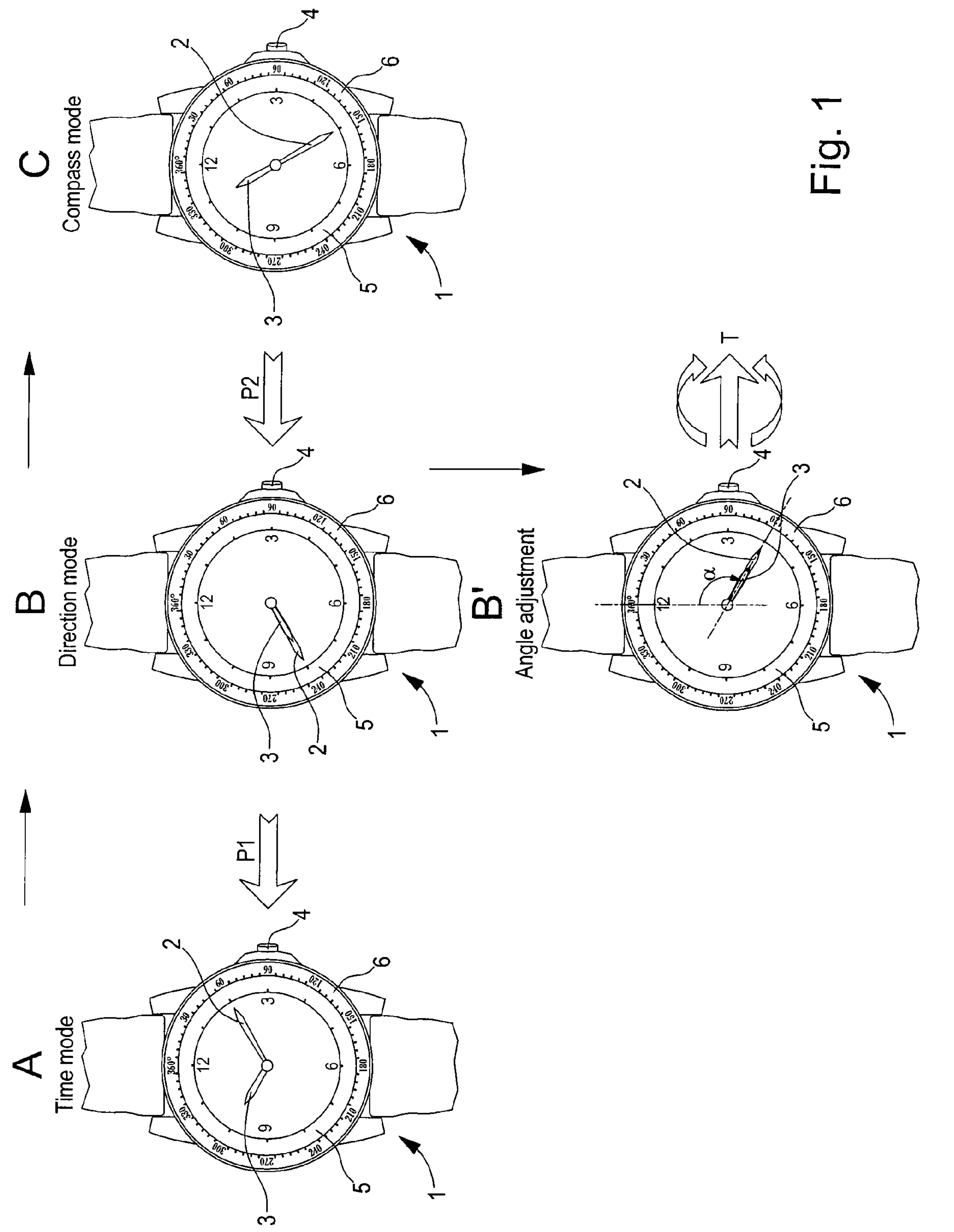
FIG. 1 shows the electronic watch according to the invention in different selected modes, and in the position for setting a direction parameter in the selected direction mode.

FIG. 1 illustrates the various modes of electronic watch 1 that can be selected, in plans A, B and C, and the setting of a direction parameter in a direction mode in plan B'. Electronic watch 1 further includes electronic time base circuits, in the watchcase and underneath dial 5, an electronic compass, not shown, for determining magnetic North. This electronic compass includes at least one terrestrial magnetic field sensor for providing detection signals for a microcontroller processing unit for calculating the direction of the North to be indicated. This electronic compass can be that disclosed in EP Patent Nos. 0 713 162 and 0 721 155, with a permanent magnet rotatably mounted in a frame and two magnetic sensors around the magnet, which are Hall probes, for picking up the magnetic field from the magnet oriented as a function of the terrestrial magnetic field. However, the electronic compass can also be made up of two magneto-inductive sensors placed perpendicularly relative to each other. Of course, corrections depending upon the place where the watch user is located can be stored in the watch memory means in order to determine geographical North correctly.

In plan A of FIG. 1, the electronic watch is in the time mode with the hour hand 3 and minute hand 2, which indicate a time of day above a dial 5 bearing conventional time markings. Electronic watch 1 also includes a manual control member 4 arranged on one side of the watchcase. This control member is preferably a rotating electronic stem crown like that disclosed in CH Patent No. 632 894 and EP Patent Nos. 0 569 868 and 1 435 633. This control member can be pressed by a user's finger into an unstable selection position against return spring means prior to returning automatically to a rest position without any action on said member. This control member 4 can also be pulled out into at least one stable parameter setting position, for example a direction parameter.

A watch bezel 6 surrounds dial 5 and the watch crystal. On this bezel 6, angular markings from 0 to 360° are shown in the clockwise direction over the entire periphery of the bezel from a 12 o'clock position of the watch. These markings are oriented on the bezel in a direction that facilitates reading by a user wearing the watch on his wrist. These angular markings are used in the direction mode to facilitate setting the direction parameter as described below.

It should be noted that electronic watch 1 is configured such that without any action on control member 4, which is in a rest position, the time mode is automatically displayed by the two hands 2, 3 as shown in plan A. Conversely, if a short application of pressure P1 is made on the control member to bring the latter into a selection position, the direction mode is selected as shown in plan B. A "short application of pressure" means pressure in the selection position of around a second. If there is no other short application of pressure on control member 4 after a programmed time interval (timeout), for example after thirty or so seconds, the hands are automatically reset to indicate the time in the time mode.

In the direction mode in plan B, hands 2, 3 are set and preferably in a superposed position to indicate the direction of a pre-programmed geographical place in the watch on the basis of the determination of magnetic North picked up by the electronic compass or the calculated geographical North. This pre-programmed geographical place is preferably Mecca. The direction indicated by the two hands to this pre-programmed geographical place depends on at least one parameter of the place where the watch user is located. The microcontroller processing unit determines an angle, from the place occupied by the watch, between the pre-programmed geographical place (Mecca) and magnetic North detected by the compass sensors or the calculated geographical North. In the selected direction mode, the watch user, such as a Muslim, will turn in the direction of the superposed hands to perform his prayers at the prescribed times.

When the direction mode is selected following a short application of pressure P1 on control member 4, it is possible to set a direction parameter on the basis of the place where the watch user is located. In order to do this just after having made the short application of pressure P1, control member 4 can be pulled out into a stable setting position T as shown in plan B'. In this setting position, the electronic watch will remain in setting mode until the direction parameter that has been set is validated after the control member has been pushed back into the rest position thereof.

In the setting position, superposed hands 2, 3 can be rotated by an angle α by rotating the stem crown control member 4 in any direction of rotation. The hands are positioned opposite an angular marking shown in bezel 6 of the watch. This angular marking corresponds to the direction parameter to be set, which is a function of the place where the watch user is located, in order for the hands to indicate the pre-programmed geographical place.

In order to facilitate the operation of setting the angle between geographical North and the pre-programmed geographical place, such as Mecca, from the place where the watch is located, several angular references corresponding to several places in the world, can be marked on the back or top of the watchband or on a credit card type card supplied with electronic watch 1. A list of angular references can also be consulted on the Internet on the site www.gibla.com.org. Hands 2, 3 are thus moved towards the marking corresponding to the inscribed reference for the place occupied by the user. As indicated above, placing control member 4 in the rest position validates the direction parameter set by the hands. This allows the superposed hands to indicate the direction appropriate for the pre-programmed geographical place in the direction mode. After the determined timeout and without any action on control member 4 in the rest position, the watch automatically returns to the time mode, where the reset hands display the time of day.

In order to pass to the compass mode shown in plan C of FIG. 1, two short successive applications of pressure P1 and P2 must be made to pass from the time mode to the compass mode, passing through the direction mode. However, if the second short application of pressure P2 is made on the control member after the first short application of pressure P1, after a slightly shorter period of time than the determined timeout, it is possible to display, via the hands, first of all the direction of the pre-programmed geographical place before the hands display the direction of magnetic or geographical North. In this compass mode, the hands 2, 3 are preferably set and positioned in opposition like the large hand of a conventional mechanical compass.

Without any action on the control member, which has returned to the rest position after the determined timeout, hands 2, 3 are automatically reset to indicate the local time in the time mode. It will thus be noted that in the three modes that can be selected, described above, the hands are arranged such that one can immediately tell which mode the electronic mode is in. Of course, the hands could be placed in opposition in the selected direction mode and superposed in the selected compass mode as the user chooses. Moreover, the order of selection between the direction mode and the compass mode could also be changed.

Figure 2:
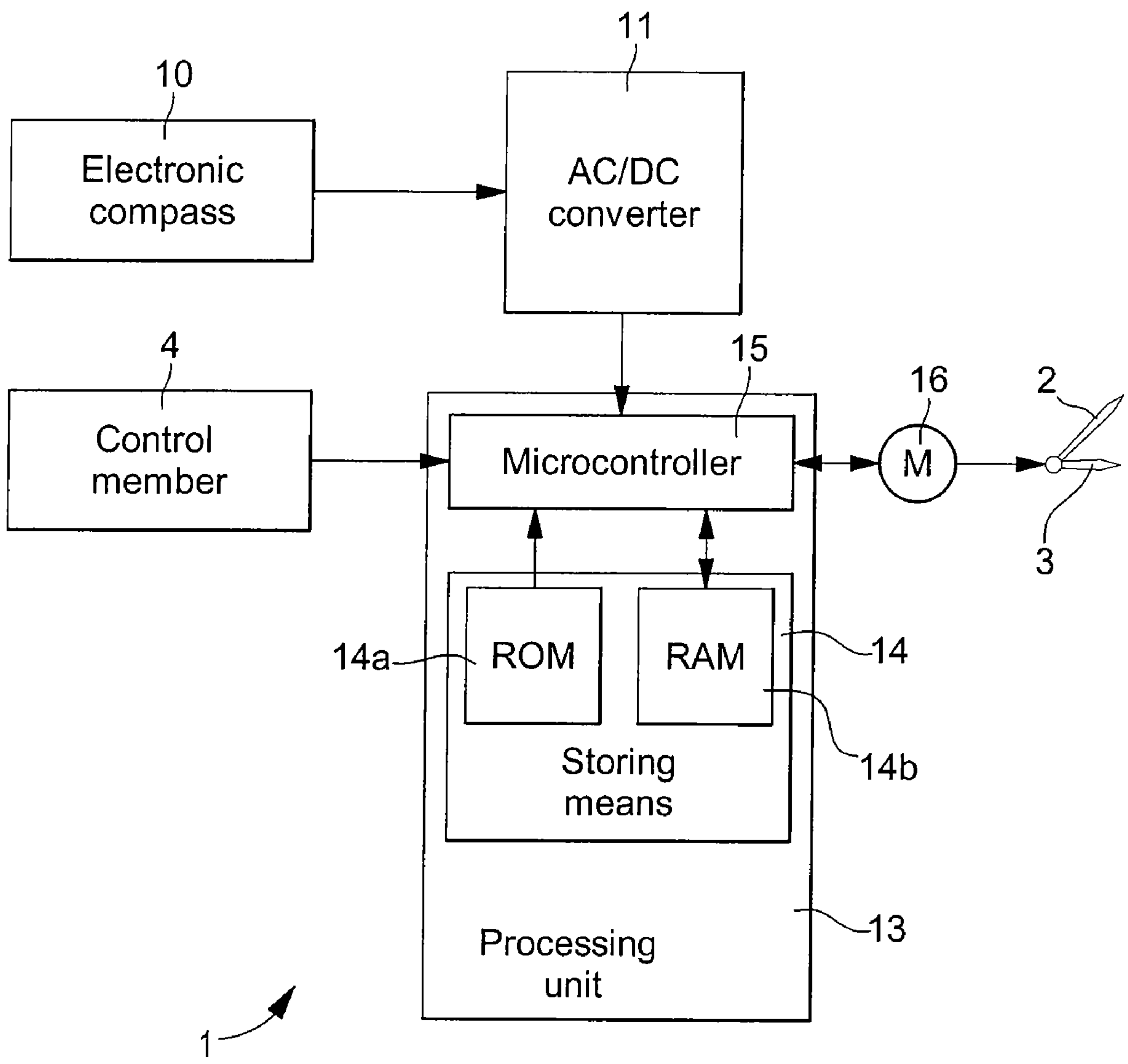
FIG. 2 shows in a simplified manner the various components of the electronic watch according to the invention.

In FIG. 2 the various components of electronic watch 1 are shown schematically. The electronic watch includes, as indicated above, an electronic compass 10. This compass 10 includes magnetic field sensors, which supply detection signals. The detection signals from the sensors are first of all converted into digital signals in a conventional AC/DC converter 11 before being supplied to the microcontroller 15 of a processing unit 13 for calculating the direction of magnetic North.

In the case of an electronic compass formed of two magneto-inductive sensors, the AC/DC converter is no longer necessary, as a simple controller can directly interpret the values measured by these sensors.

As a function of the correction data stored in storage means 14 of the processing unit, for example in a non-volatile memory 14*a* (ROM or EEPROM), the microcontroller can calculate geographical North in a known manner, which depends upon the place in the world where the watch is located. The latitude and longitude coordinates of the pre-programmed geographical place, such as Mecca, are also stored in the non-volatile memory. Storage means 14 also include a RAM type volatile memory 14*b* in which some setting data can be stored, introduced therein by the user. The direction setting parameter is also stored in volatile memory 14*b*.

Microcontroller 15 can also include some modules relating to the time base for controlling the time display by hands 2, 3 on the watch dial. An oscillator stage connected to a quartz resonator, not shown, forms part of microcontroller 15 for clocking various operations of the watch. The oscillation frequency can be conventionally of the order of 32,768 Hz.

This microcontroller 15 also has the function of controlling motorised means 16 for driving the hands, which can be made as indicated in EP Patent No. 0 713 162, with a first electric motor for hour hand 3 and a second electric motor for minute hand 2. Microcontroller 15 knows the position of the hands at all times. Microcontroller 15 can control motorised means 16 as a function of the activation of control member 4 for placing hands 2, 3 in the direction mode or in the compass mode as described with reference to FIG. 1.

If electronic watch 1 is provided with sufficient memory and a suitable calculation algorithm, data can also be provided to the Muslim user concerning prayer times depending upon the exact place where he is located. However, the electronic watch must be able to indicate also the date, since prayer times vary from day to day depending upon geographical location and the sunrise and sunset. An alarm indicating prayer times can also be provided and set by the same control member 4.

The direction parameter can also be set by positioning the superposed hands in the direction mode on a numbered indication of the minutes on the dial corresponding to an indexed and stored geographical place, which has to be validated. A counter of the processing unit can also take account of one or several revolutions of the dial by the superposed hands to define more than 60 stored geographical places (towns). Despite the fact that some precision as regards the times to be respected for performing these Muslim prayers is of rigour, depending upon the geographical place occupied, the manipulations for programming and switching on must stay simple for the user using a single manual control member. However, the electronic watch can also include an additional LCD type display screen for displaying, for example, the places in the world, such as cities, by rotating the stem crown in the setting position.

From the description that has just been given, multiple variants of the electronic watch with an indication of the direction of a pre-programmed geographical place, such as Mecca, can be devised by those skilled in the art, without departing from the scope of the invention defined by the claims. This electronic watch could also be used for a sporting activity, such as orienteering. An electronic bezel, rotatably mounted on the middle part of the watch or one or several capacitive tactile keys underneath the watch crystal, could be used as the control member. The hands could be moved opposite a determined marking on the dial or the bezel in a direction parameter setting position via the action of a finger on the tactile keys. Markings for cities of the world could be made on the dial and/or the bezel for setting the direction parameter.

What is claimed is:

1. An electronic watch with an indication of the time by at least two hands, including:

at least one terrestrial magnetic field sensor of an electronic compass integrated in the watchcase, a processing unit with a microcontroller for calculating the direction of North on the basis of detection signals provided by the magnetic sensor, motorised means driving the hands controlled by the processing unit in order to place the hands in a time mode, a selected direction mode or a selected compass mode, and a manual control member connected to the microcontroller processing unit, wherein the control member can be manually activated in a selection position in order to perform selection from the time mode to the direction mode and/or the compass mode, or in a setting position from the selected direction mode so as to set, by means of at least one of the two hands, a direction parameter for a pre-programmed geographical place as a function of the geographical place where the watch is located, and wherein in the selected direction mode, the two hands are in a superposed position or in opposition to indicate the direction of the pre-programmed geographical place, whereas in the selected compass mode, the hands are positioned, contrary to the direction mode, in opposition or in a superposed position to indicate the direction of North.

2. The electronic watch according to claim 1, wherein the control member is an electronic stem crown able to be pressed in from a rest position to an unstable selection position against spring means, and to be pulled out from a rest position to a stable setting position in order to move the two superposed hands, by rotating the crown, into the selected direction mode to a marking on the watch dial or on the watch bezel corresponding to the direction parameter to be set.

3. The electronic watch according to claim 2, wherein it includes a bezel on which angular markings from 0 to 360° are shown in the clockwise direction over the entire periphery of the bezel from a 12 o'clock position on the watch.

4. The electronic watch according to claim 2, wherein the processing unit with the microcontroller is programmed such that, when the control member is pressed a first time, the direction mode is selected to indicate a direction of a pre-programmed geographical place by using the two superposed hands, and that when the control member is pressed a second time within a predetermined interval of time, the compass mode is selected to indicate the direction of North using the two hands arranged in opposition, and without any action of the control member after the predetermined time interval, the time mode is selected.

5. The electronic watch according to claim 1, wherein it includes a wristband on which several geographical places are shown, each with a numbered reference defining a geographical azimuth relative to the pre-programmed geographical place, the geographical azimuth being the direction parameter to be set in the selected direction mode.

6. The electronic watch according to claim 3, wherein the processing unit with the microcontroller is programmed such that, when the control member is pressed a first time, the direction mode is selected to indicate a direction of a pre-programmed geographical place by using the two superposed hands, and that when the control member is pressed a second time within a predetermined interval of time, the compass mode is selected to indicate the direction of North using the two hands arranged in opposition, and without any action of the control member after the predetermined time interval, the time mode is selected.

* * * * *